(12) United States Patent
Bryant et al.

(10) Patent No.: US 10,729,073 B2
(45) Date of Patent: Aug. 4, 2020

(54) GROUNDS MAINTENANCE VEHICLE WITH POWER SYSTEM INCORPORATING DUAL DRIVE SHAFTS

(71) Applicant: Exmark Manufacturing Company, Incorporated, Beatrice, NE (US)

(72) Inventors: Christian S. C. Bryant, Lincoln, NE (US); Nickolas T. Moore, Beatrice, NE (US)

(73) Assignee: Exmark Manufacturing Company, Incorporated, Beatrice, NE (US)

(*) Notice: Subject to any disclaimer, the term of this patent is extended or adjusted under 35 U.S.C. 154(b) by 332 days.

(21) Appl. No.: 15/803,979

(22) Filed: Nov. 6, 2017

(65) Prior Publication Data

US 2019/0133039 A1    May 9, 2019

(51) Int. Cl.

| | | |
|---|---|---|
| *A01D 34/64* | (2006.01) | |
| *A01D 69/00* | (2006.01) | |
| *A01D 69/03* | (2006.01) | |
| *A01D 34/00* | (2006.01) | |
| *A01D 34/82* | (2006.01) | |
| *A01D 34/76* | (2006.01) | |
| A01D 69/08 | (2006.01) | |
| A01D 101/00 | (2006.01) | |

(52) U.S. Cl.
CPC ........... *A01D 69/03* (2013.01); *A01D 34/001* (2013.01); *A01D 34/64* (2013.01); *A01D 34/76* (2013.01); *A01D 34/82* (2013.01); *A01D 69/08* (2013.01); *A01D 2101/00* (2013.01)

(58) Field of Classification Search
CPC ...... A01D 34/76; A01D 34/001; A01D 42/00; A01D 43/16; A01D 34/74; A01D 34/82; A01D 69/03; A01D 34/64; A01D 69/08; F02B 63/02; F02B 63/00; F02B 63/04; F02B 67/04; F02B 75/007
USPC .... 56/13.7, 11.3, 11.6, 17.1, 256, 16.9, 14.7
See application file for complete search history.

(56) References Cited

U.S. PATENT DOCUMENTS

| | | | |
|---|---|---|---|
| 3,192,693 A | * | 7/1965 | Bergeson ............... A01D 43/16 56/13.7 |
| 3,857,515 A | | 12/1974 | Zennie |
| 4,242,855 A | | 1/1981 | Beaver, Jr. |
| 4,653,254 A | | 3/1987 | Qualls |
| 4,821,959 A | | 4/1989 | Browning |
| 5,894,907 A | * | 4/1999 | Peter ..................... B60K 7/0015 180/337 |
| 6,192,853 B1 | | 2/2001 | Natsume |
| 6,644,264 B2 | | 11/2003 | Shoemaker |

(Continued)

OTHER PUBLICATIONS

Wright Manufacturing, "Dimensional Information Regarding Wright Stander X Mower" Model WSTX52FX730E, Frederick, Maryland. Manufactured in 2016; 1 page.

(Continued)

*Primary Examiner* — Robert E Pezzuto
(74) *Attorney, Agent, or Firm* — Mueting, Raasch & Gebhardt, P.A.

(57) ABSTRACT

Vehicles including a power system incorporating dual drive shafts. An exemplary power system may include an engine having a vertically-oriented crankshaft that extends outwardly both below the engine (lower drive shaft) and above the engine (upper drive shaft). The lower drive shaft may power an implement of the vehicle via an implement drive system, while the upper drive shaft may power drive wheels of the vehicle via a traction drive system. In another embodiment, the second drive shaft may be formed by a jackshaft adjacent the engine.

14 Claims, 9 Drawing Sheets

(56) References Cited

U.S. PATENT DOCUMENTS

| | | | | |
|---|---|---|---|---|
| 6,675,562 | B2* | 1/2004 | Lawrence | A01D 34/6806 56/16.9 |
| 7,007,659 | B2 | 3/2006 | Chittenden | |
| 8,047,310 | B2 | 11/2011 | Kallevig | |
| 8,096,374 | B1 | 1/2012 | Papke et al. | |
| 8,104,552 | B2 | 1/2012 | Papke et al. | |
| 8,250,839 | B2* | 8/2012 | Giddens | A01D 34/82 56/13.7 |
| 9,021,776 | B2* | 5/2015 | Zwieg | A01D 34/64 56/17.1 |
| 2010/0282187 | A1 | 11/2010 | Gilpatrick | |
| 2011/0192158 | A1 | 8/2011 | Simon | |
| 2013/0074464 | A1 | 3/2013 | Gindt et al. | |
| 2013/0074466 | A1 | 3/2013 | Zwieg et al. | |
| 2013/0074467 | A1 | 3/2013 | Zwieg et al. | |

OTHER PUBLICATIONS

Wright Manufacturing, "Dimensional Information Regarding Wright Stander Mower" Model WS36FS600RE, Frederick, Maryland. Manufactured in 2015; 1 page.

Exmark Manufacturing Company, Inc., "Dimensional Information Regarding Exmark Vantage Mower" Model VTS740EKC60400, Beatrice, Nebraska. Models having these dimensions available no later than 2015; 1 page.

Exmark "Vantage™ 36 inch models" Operator's Manual. For Serial Nos. 920,000 & Higher. Part No. 4500-897 Rev. A, Exmark Manufacturing Company, Inc., Beatrice, Nebraska, Copyright 2011; 52 pages.

Exmark "Vantage™ Model No. VT18KA363—Serial No. 920000 and Up" Parts Manual. Part No. 4500-744 Rev. A, Exmark Manufacturing Company, Inc., Beatrice, Nebraska, Copyright 2011; 32 pages.

"Wright Stander Commercial Mower Owner's Manual—for Stander Serial Nos. 49705 and Higher Until Superseded." Wright Manufacturing, Inc., Frederick Maryland, 2009; 28 pages.

"Wright Stander Instruction Manual—Small Frame Standers serial # 54956 and higher." Wright Manufacturing, Inc., Frederick Maryland, 2012; 40 pages.

Wright Stander X—Instruction Manual, Stander X, Serial 54956 and Higher. Wright Manufacturing, Inc., Frederick Maryland, 2012; 40 pages.

\* cited by examiner

GROUNDS MAINTENANCE VEHICLE WITH POWER SYSTEM INCORPORATING DUAL DRIVE SHAFTS

The present disclosure is directed to grounds maintenance vehicles such as stand-on lawn mowers and, more particularly, to such a vehicle incorporating a power system that utilizes dual drive shafts.

BACKGROUND

Riding grounds maintenance vehicles such as lawn mowers and the like are used by homeowners and professionals alike to care for lawns and other surfaces. These vehicles include a prime mover, e.g., internal combustion engine or electric motor, to power not only an implement (e.g., cutting deck) attached to the vehicle, but also a traction drive system, the latter adapted to propel the vehicle over a ground surface.

Landscape contractors sometimes prefer stand-on mowers or mowers with sulkies, which include an operator platform that is attached to (or, in case of a sulky, towed behind) the mower. Such mowers allow turf to be mowed in an efficient, relatively quick manner as compared to some walk-behind and conventional riding mowers.

One benefit of stand-on mowers is that they are often shorter than conventional riding mowers and, consequently, may be more maneuverable under certain mowing conditions. Typically, stand-on mowers utilize an engine having a horizontally or vertically-oriented drive shaft to provide power, e.g., via endless belts, to both the cutting deck and to the traction drive system. Each drive wheel may utilize its own hydrostatic pump, and each pump may be independently controlled to provide the mower with a very small turning radius and, in some instances, a zero-turning-radius (ZTR) wherein the mower can spin about a midpoint between the two drive wheels.

While effective, stand-on mowers must ensure sufficient space is provided (e.g., proximate the drive shaft) to accommodate power connections to both the implement and traction drive systems. For example, for a vehicle having an engine with a downwardly-extending (vertically-oriented) drive shaft, the engine is generally positioned at a sufficient elevation to allow space below the engine to accommodate both drive shaft pulleys. Such engine positioning may be undesirable for a variety of reasons. For example, an elevated engine may cause the vehicle to have a relatively high center of gravity, and potentially a greater fleeting angle for the drive belt extending between the drive shaft and the implement. Moreover, sufficient space adjacent (e.g., behind) the engine may be needed to accommodate pump placement. As one can appreciate, these design considerations may increase mower height and length.

SUMMARY

Embodiments described herein may provide a riding grounds maintenance vehicle having a configuration that addresses these and other issues.

For example, in one embodiment, a powered grounds maintenance vehicle is provided that includes: a frame having a front end and a rear end, the frame supported upon a ground surface by ground engaging members; an implement connected to the frame; and a traction drive system supported by the frame, the drive system adapted to provide driving power to at least one of the ground engaging members. A prime mover is also included and attached to the frame. The prime mover includes: an upper side and a lower side; a vertical first drive shaft extending downwardly from the lower side, the first drive shaft adapted to provide power to one of the implement and the traction drive system; and a vertical second drive shaft extending upwardly from the upper side, the second drive shaft adapted to provide power to the other of the implement and the traction drive system.

In another embodiment, a stand-on riding grounds maintenance vehicle is provided that includes a frame having a front end, a rear end, and a longitudinal axis extending between the front and rear ends, the frame further comprising a control tower at or near the rear end. A platform is attached to the frame at or near the rear end, wherein the platform is adapted to support a standing operator. The vehicle also includes: left and right rear drive wheels located near the rear end of the frame; left and right front wheels located near the front end of the frame; an implement connected to the frame; and a traction drive system supported by the frame, the drive system adapted to provide driving power independently to each of the left and right rear drive wheels. An engine is also attached to the frame at or near the control tower, the engine including: an engine housing having an upper side and a lower side; a vertical first drive shaft extending downwardly from the lower side, the first drive shaft operatively connected to a first pulley, wherein a first belt is operatively coupled to the first pulley and to an input pulley associated with the implement; and a vertical second drive shaft extending upwardly from the upper side, the second drive shaft operatively connected to a second pulley, wherein a second belt is operatively coupled to the second pulley and to a plurality of input pulleys associated with the traction drive system.

In another embodiment, a grounds maintenance vehicle is provided that includes: a frame having a front end and a rear end, the frame supported upon a ground surface by ground engaging members; an implement connected to the frame; and a traction drive system supported by the frame, the drive system adapted to provide driving power to at least one of the ground engaging members. A prime mover is also attached to the frame, wherein the prime mover includes a drive shaft protruding from a housing of the prime mover, the drive shaft having first and second drive pulleys. A jackshaft is positioned adjacent the prime mover and includes: a first end proximate the drive shaft; and a second end, wherein the jackshaft comprises an input pulley located at or near the first end, and an output pulley located at or near the second end, the input pulley operatively connected to the second drive pulley. The first drive pulley is operatively connected to one of the implement and the traction drive system, and the output pulley is operatively connected to the other of the implement and the traction drive system.

In yet another embodiment, a grounds maintenance vehicle is provided that includes: a frame having a front end and a rear end, the frame supported upon a ground surface by ground engaging members; an implement connected to the frame; and a traction drive system supported by the frame, the drive system adapted to provide driving power to at least one of the ground engaging members. A prime mover is also attached to the frame, the prime mover including a vertically-oriented drive shaft protruding from a housing of the prime mover. The drive shaft includes first and second drive pulleys, wherein the first drive pulley is operatively engaged with the implement positioned at or near a first side of the engine, and the second drive pulley is operatively engaged with the traction drive system positioned at or near a second side of the engine that is opposite the first side of the engine.

In still yet another embodiment, a grounds maintenance vehicle is provided that includes: a frame having a front end, a rear end, and a longitudinal axis extending between the front and rear ends; ground engaging members supporting the frame upon a ground surface; an implement connected to the frame; and a platform connected to the frame and adapted to support a standing operator. A prime mover is also connected to the frame and adapted to provide power to both the implement and at least one of the ground engaging members. The prime mover is secured to a stationary portion of the frame such that the prime mover remains at a fixed elevation relative to the frame during vehicle operation. The prime mover further includes a housing defining a lowermost housing surface, wherein the lowermost housing surface is located at an elevation of 8 inches to 13 inches above a horizontal plane containing the ground surface.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
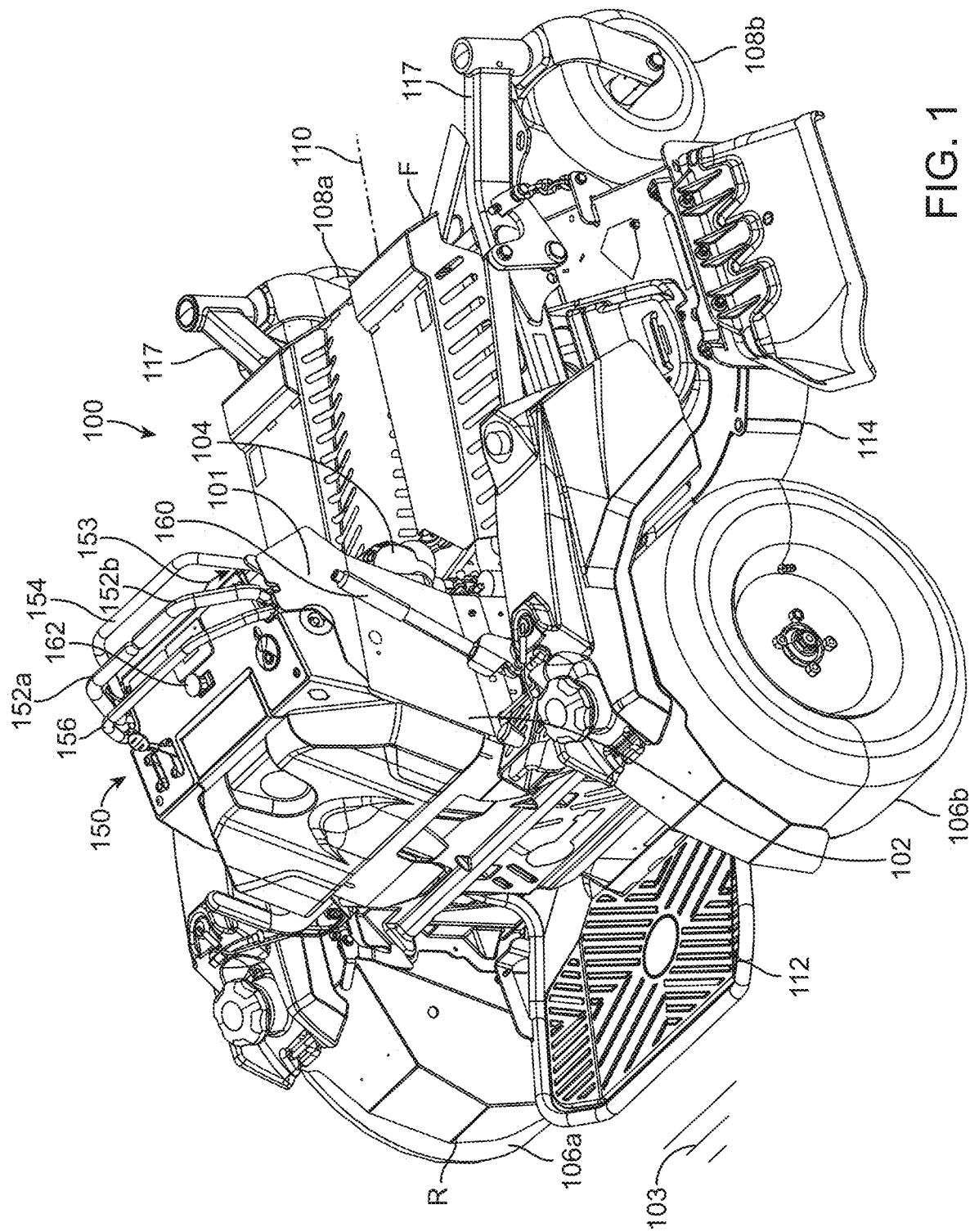
FIG. 1 is a right rear perspective view of a self-propelled grounds maintenance vehicle, e.g., stand-on lawn mower, incorporating a power system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of exemplary embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified by the term "about."

Embodiments of the present disclosure are directed to powered (e.g., self-propelled) grounds maintenance vehicles incorporating a power system that powers both an implement attached to the vehicle and a traction drive system. For example, embodiments of the present disclosure may provide a grounds maintenance vehicle having a vehicular power system including dual drive shafts: a first drive shaft providing power to the implement via an implement drive system; and a second drive shaft providing power to ground-engaging members of the vehicle via the traction drive system. In the illustrated embodiments, the first drive shaft is at a lower position relative to the upper second drive shaft. However, such a construction is exemplary only as embodiments wherein the implement drive system is driven from the top drive shaft and the traction drive system is driven from the lower drive shaft (e.g., a snow thrower vehicle) are certainly contemplated.

With reference to the figures of the drawing, wherein like reference numerals designate like parts and assemblies throughout the several views, FIG. 1 illustrates a vehicular power system in accordance with one embodiment of the present disclosure as it may be incorporated on a self-propelled vehicle, e.g., a mid-size lawn mower 100. While, for the sake of brevity, embodiments of the disclosure are herein described with reference to a mid-size stand-on mower (hereinafter generically referred to simply as a "mower"), those of skill in the art will realize that the concepts described herein are equally applicable to other types of walk-behind and ride-behind mowers (e.g., such as those utilizing sulkies), as well as to almost any other walk-behind, ride-behind, or ride-on self-propelled, grounds maintenance vehicle. Such vehicles may include, for example, skid-steer loaders, aerators, material spreaders and sprayers, snow throwers, tillers, etc.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that ground engaging members (e.g., wheels 106 and 108)

rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While not necessarily central to an understanding of exemplary embodiments of the present disclosure (e.g., other mower and other vehicle configurations are certainly contemplated), the general construction of the exemplary mower 100 is briefly described below. FIG. 1 illustrates the mower 100 having a chassis or frame 102 having a front end F and a rear end R (and a longitudinal axis 110 extending between the front and rear ends), the frame 102 supporting a power source or prime mover, e.g., internal combustion engine 104. A pair of transversely opposing, ground engaging members, e.g., first and second (left and right) rear drive wheels 106a and 106b, may be coupled to opposite (left and right) rear sides of the chassis to support the mower upon, and propel the mower 100 relative to, the ground surface 103. Each drive wheel 106 may be powered by its own hydraulic motor 105 (left and right motors 105a, 105b shown in FIG. 3) that receives power from, at least in one embodiment, its own hydrostatic pump 107 (see left and right pumps 107a, 107b in FIG. 3). The pumps 107 may be supported by the frame 102 and powered by the engine 104 as further described below, via a traction drive system 200. While not illustrated, other drive systems, e.g., gear or pulley driven systems, may also be utilized without departing from the scope of the disclosure.

Operator controls, as further described below, permit independent control of the speed and direction of each drive wheel 106, allowing operator control of mower 100 speed and direction generally from a walking or riding (e.g., standing) position generally behind the mower 100. A pair of front ground engaging members (e.g., left and right caster wheels 108a, 108b), which may be connected to forwardly extending frame rails 117, may support the front of the mower 100 in rolling engagement with the ground surface 103.

Although the illustrated mower 100 has the drive wheels 106 in the rear and caster wheels 108 in front, this configuration is not limiting. For example, other embodiments may reverse the location of the wheels, e.g., drive wheels in front and driven or undriven wheels in back. Moreover, other configurations may use different wheel configurations altogether, e.g., a tri-wheel configuration or a vehicle having conventionally-steered wheels. These and other embodiments are certainly possible without departing from the scope of the present disclosure. Moreover, while illustrated herein as wheels, other ground engaging members (e.g., tracks, skids, etc.) are also contemplated.

An implement, e.g., cutting deck 114, may be connected to a lower side of the frame 102 (generally longitudinally between the drive wheels 106 and the caster wheels 108). The cutting deck 114 may include one or more cutting blades (not shown) as known in the art. The cutting blades may be operatively powered, via spindles connected to the deck, by the engine 104 via an implement drive system 300 (see FIG. 3) as further described below. During operation, power is selectively delivered to the cutting deck 114, whereby the blades rotate at a speed sufficient to sever grass and other vegetation as the cutting deck passes over the ground surface 103. As indicated above, other grounds maintenance vehicles (e.g., snow throwers) may locate the implement above the frame, or at other locations along the lower side of the frame (e.g., a forwardly-mounted or "out-front" deck configuration). Moreover, while described as a cutting deck, the implement may be any tool (e.g., snow thrower, aerator, etc.) that attaches to the frame 102.

The exemplary mower 100 may further include a standing platform 112 attached to the frame 102 at or near the rear end R. The platform, which may support a standing operator, may be moved between a deployed position as shown in FIG. 1, and a stowed position (not shown, but similar to the position of the platform 120 shown in FIG. 2 of U.S. Pat. No. 8,047,310). In the deployed position, an operator may stand upon the platform 112 during vehicle operation. Alternatively, the platform may be moved to the stowed position to accommodate the operator in a walk-behind configuration. In the deployed position, at least a portion of the platform 112 may be located between the rear drive wheels 106.

Figure 2:
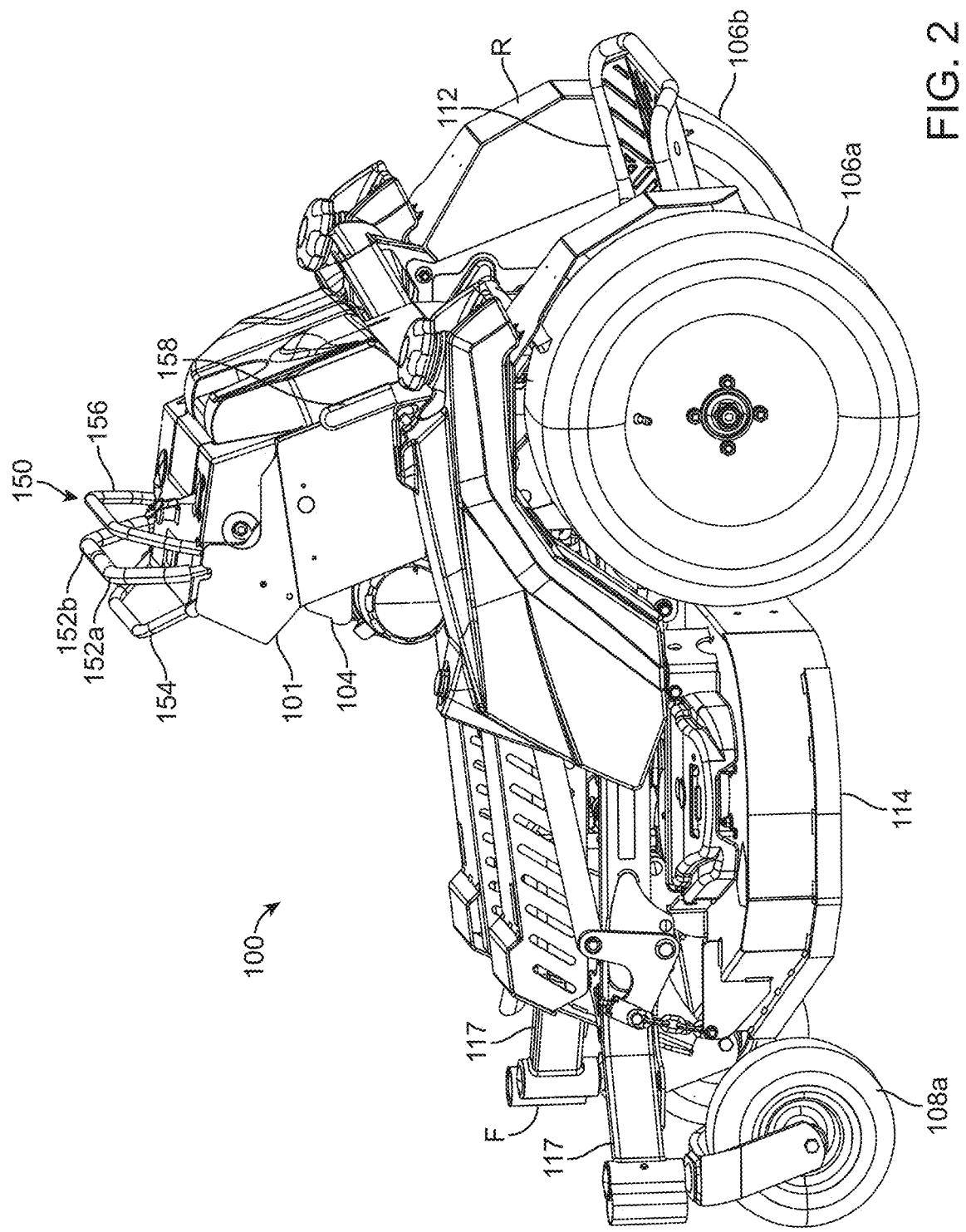
FIG. 2 is a left rear perspective view of the stand-on riding mower of FIG. 1.

As illustrated in FIGS. 1-2, the mower 100 may further include an operator control system 150. In the illustrated embodiment, the control system 150 may include operator controls that are mounted to upwardly extending portions of the frame referred to herein as control tower 101. The control tower 101 may be located at or near the rear end R of the mower 100. Situated near the top of the control tower is a control area that positions mower controls within comfortable reach of an operator who may be standing either behind the mower or upon the platform 112.

The control system 150 may include a first control lever 152a and a second control lever 152b pivotally attached to the mower 100, e.g., to the control tower 101. The control levers 152 may be configured to pivot about a generally transverse axis (i.e., an axis transverse to the longitudinal axis 110 of the mower 100) between a first or forward stop 154, and a second or rearward stop 156. One or both of the control levers 152 (e.g., 152b as shown in FIG. 1) may also be biased for pivotal outward movement (e.g., in a direction 153 about an axis generally parallel to the longitudinal axis 110). Such a configuration may permit, upon pivotal inward movement of the control lever 152b by the operator to the position shown in FIG. 1, activation of an operator presence switch (not shown). As is recognized in the art, actuation of the operator presence switch may be required before the operator can activate various mower subsystems.

The control levers 152 may further be biased to an intermediate, neutral position between the two stops 154 and 156 as shown in FIGS. 1 and 2. Movement of either of the control levers 152 (e.g., lever 152a) forwardly (e.g., towards the forward stop 154) may result in an incremental increase in forward speed of the respective drive wheel 106 (e.g., wheel 106a) via a traction drive system as described below. Similarly, movement of either of the control levers rearwardly (e.g., towards the rearward stop 156) may result in an incremental increase in rearward speed of the respective drive wheel 106. The neutral position of the control levers 152 may be located more closely to the rearward stop 156 to provide a greater range of movement of the levers for forward speed control.

The control levers 152 may each thus be movable between a first neutral position corresponding to first or zero forward velocity of its respective drive wheel 106, and a second position (abutting the forward stop 154) corresponding to a second or maximum forward velocity of its respective drive wheel. As a result, each control lever 152 may independently vary a velocity of its respective drive wheel 106 incrementally between zero forward velocity and maximum forward velocity without varying the engine throttle. Each lever 152 may additionally be movable to a third position (abutting the stop 156) corresponding to a maximum reverse velocity of its respective drive wheel 106.

As FIGS. 1 and 2 illustrate, the control system 150 may also include other features. For instance, a parking brake handle 158 may be provided to selectively activate a brake when the vehicle is parked. A deck height adjustment lever 160 may also be provided to adjust the cutting height of the deck 114. Other controls may include a throttle lever to control the speed of the engine 104, and an implement clutch control 162 to initiate and terminate power delivery to the cutting blades of the mower deck 114.

Figure 3:
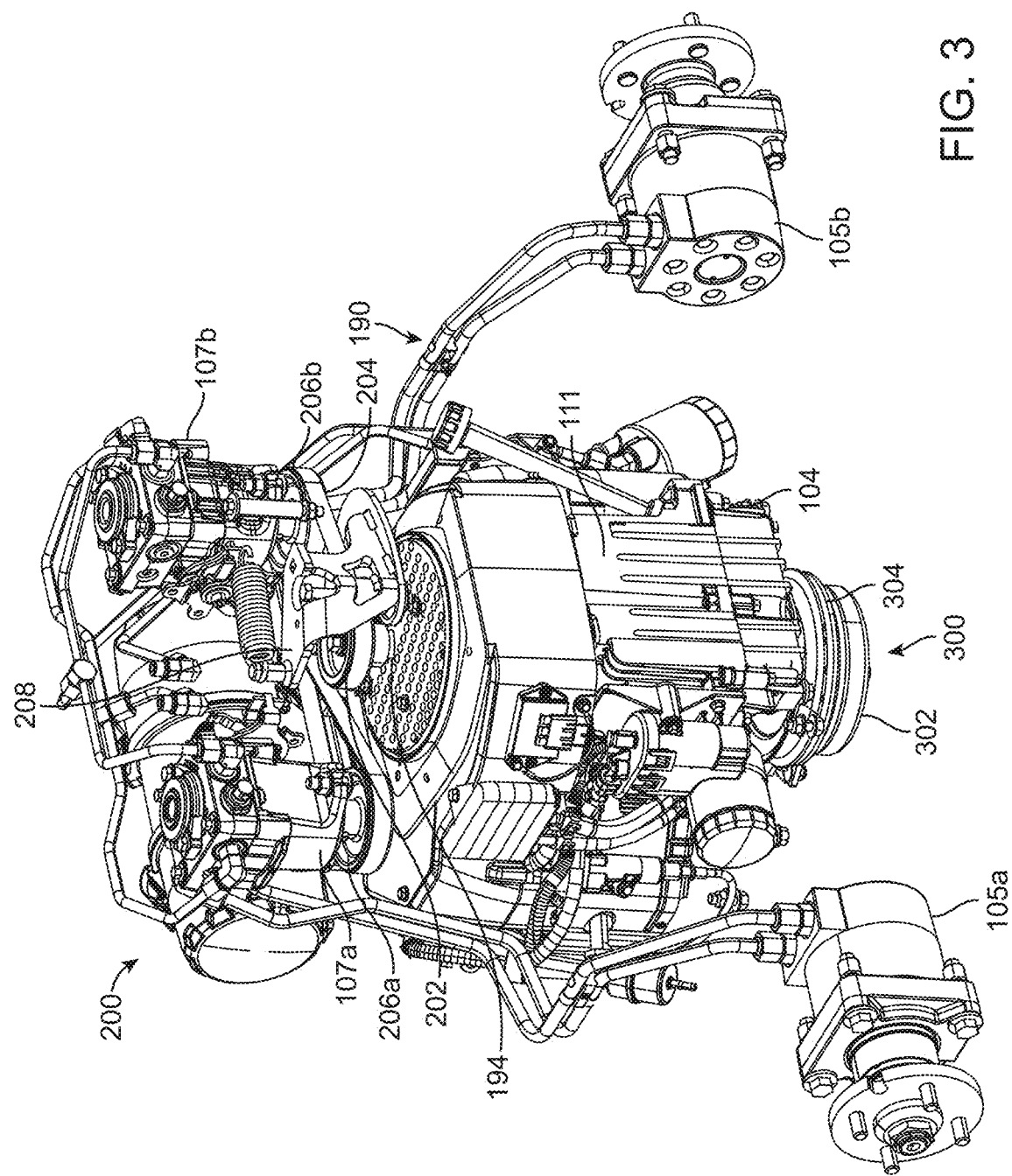
FIG. 3 illustrates a power source and traction drive system in accordance with embodiments of the present disclosure, the power source and drive system shown isolated from the mower of FIG. 1.

With this brief introduction, a power system 190 in accordance with embodiments of the present disclosure will now be described, initially with reference to FIG. 3. The exemplary power system 190 may include the power source (e.g., the engine 104), as well as the traction drive system 200 and implement drive system 300.

Figure 4:
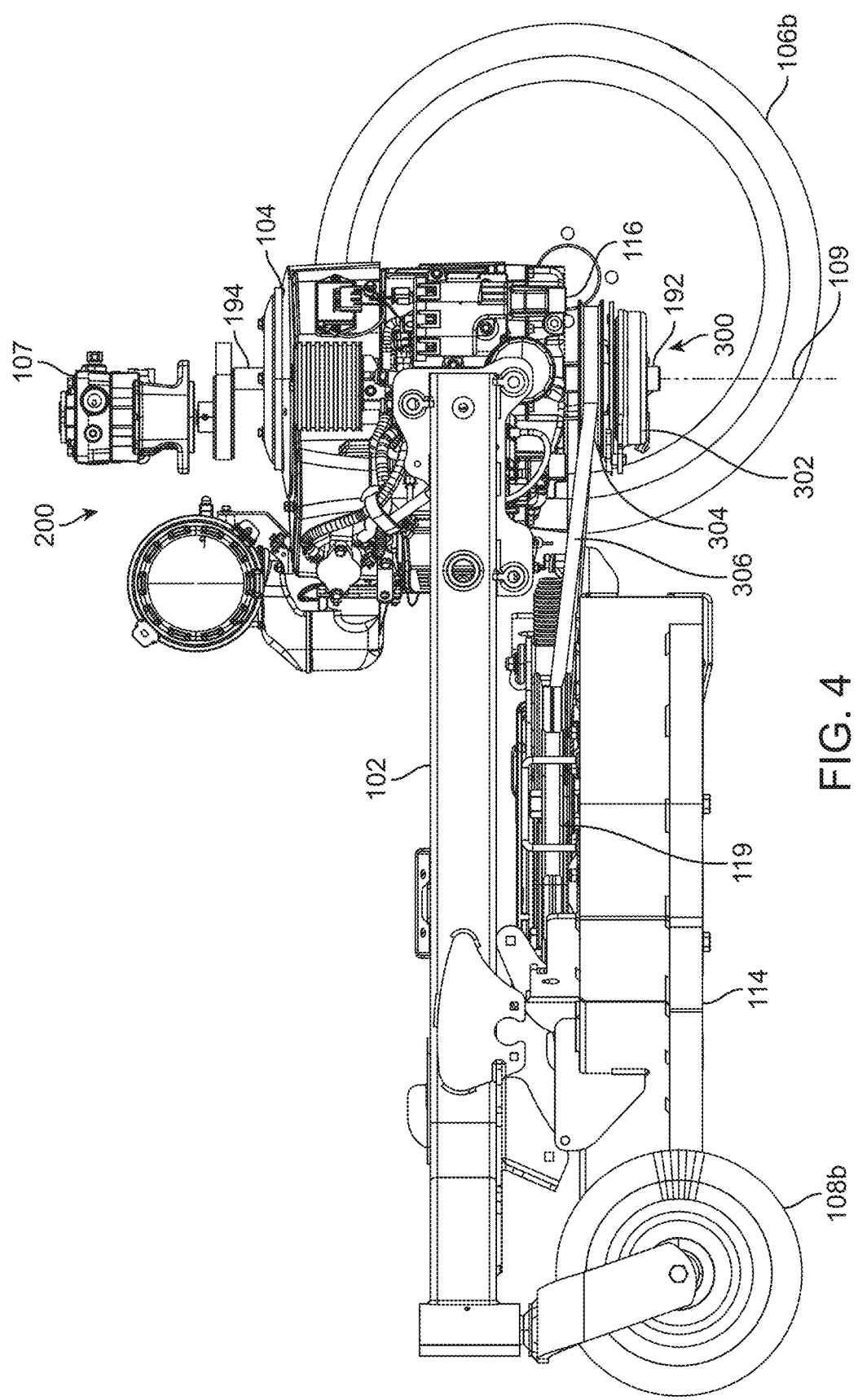
FIG. 4 is a partial side elevation view of the mower of FIG. 1 illustrating an exemplary power source, traction drive system, and implement drive system relative to a frame of the mower.

The engine 104 may include a vertically-oriented crankshaft that extends downwardly from a lower side or surface of the engine housing 111, to provide a first or lower drive shaft 192 (see FIG. 4). In the illustrated embodiments, the implement drive system 300 (which may be at or near a first or lower side of the engine) includes an electro-magnetic clutch 302 attached to the lower drive shaft 192. The clutch 302 includes a drive pulley 304 about which an endless belt 306 of the drive system 300 is routed as shown in FIG. 4. The belt 306 is also engaged with an input or driven pulley 119 on the cutting deck 114 as is known in the art. When the clutch 302 is actuated (e.g., via the control 162 (see FIG. 1), the pulley 304 becomes engaged with the lower drive shaft 192 and rotates therewith. As a result, the lower drive shaft 192, via the belt 306, provides power to the deck 114, causing the blades (not shown) to rotate. Similarly, de-energizing the clutch 302 disables power delivery to the cutting deck 114.

The engine 104 may include a flywheel (not shown) contained within the engine housing near an upper side, wherein the flywheel is attached to the crankshaft. Advantageously, the crankshaft of the engine 104 may further form a second or upper drive shaft 194 as shown in FIGS. 3 and 4 that protrudes above an upper side or surface of the engine 104 housing as shown. Stated alternatively, the engine 104 may provide a common crankshaft having coaxial opposite ends that extend vertically through the engine 104 to form both first and second drive shafts 192, 194. In some embodiments, the drive shafts 192, 194 are coaxial, i.e., they define a common rotational axis 109 as shown in FIG. 4. However, embodiments utilizing separate and/or eccentric drive shafts are also contemplated.

Figure 5:
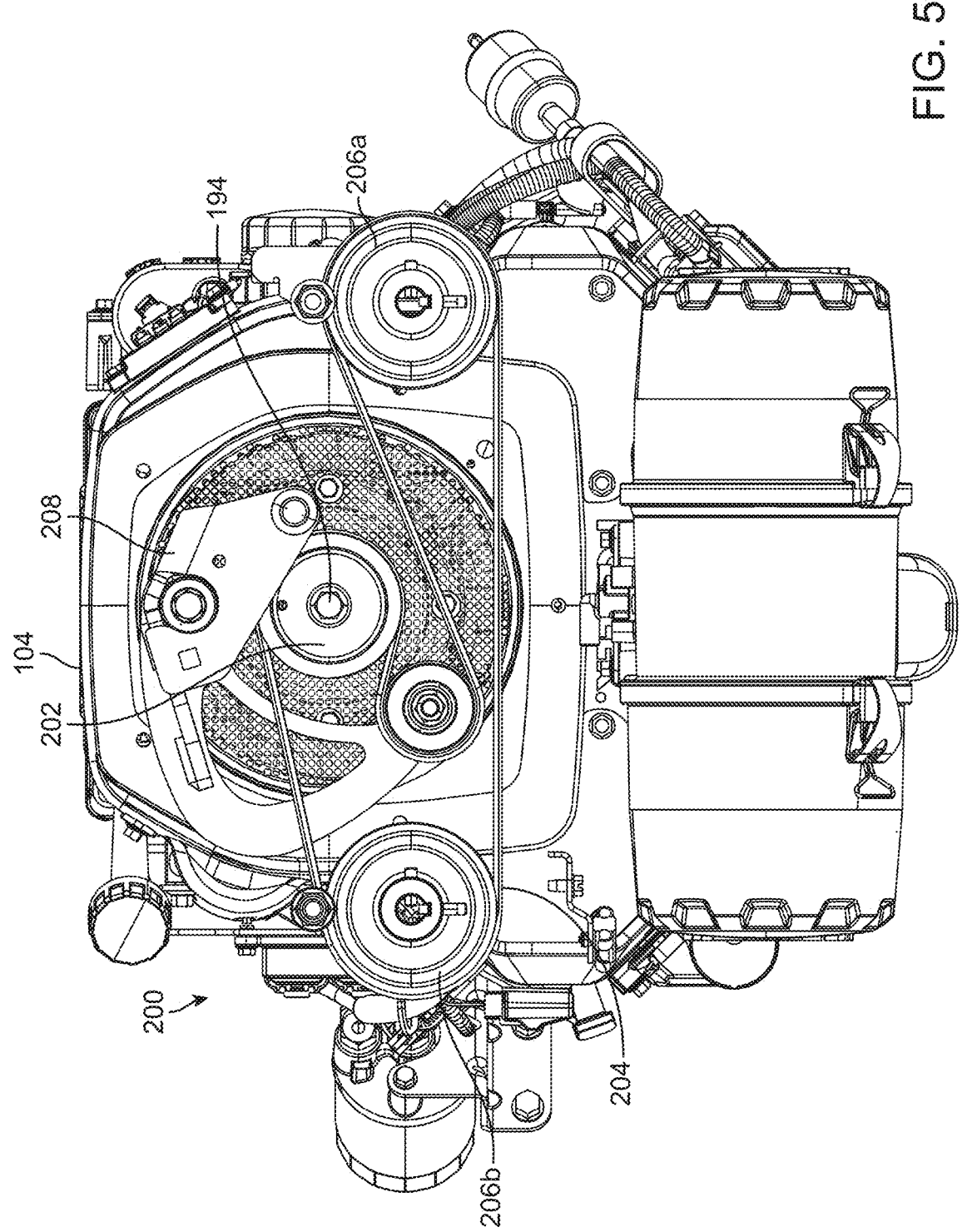
FIG. 5 is a top plan view of the power source and drive system of FIGS. 3 and 4.

Attached to the upper drive shaft 194 is a drive pulley 202 of the traction drive system 200. The traction drive system 200 (which may be located at or near a second or upper side of the engine (e.g., the side opposite the lower side)) further includes the hydrostatic pumps 107a, 107b (see FIG. 3), and a belt 204 that connects the drive pulley 202 to one or more input pulleys 206 (input pulleys 206a, 206b) of the respective pumps 107 to provide power to the traction drive system 200. The traction drive system 200 may also include the left and right hydraulic motors 105a, 105b. A biased idler assembly 208 may be provided to maintain the belt 204 in tension at all times (e.g., when the engine 104 is running, the input pulleys 206 receive power). FIG. 5 is a top plan view of the engine 104 and components of the traction drive system 200. As shown in FIG. 5, in addition to locating the traction drive system (e.g., the left and right hydrostatic pumps 107) at an elevation above the upper side of the engine 104, the pumps may also be longitudinally located between a front and a rear side of the engine housing. Of course, such a configuration is exemplary only as embodiments wherein the pumps are located elsewhere (e.g., forward of or lateral to the engine) are also contemplated.

Figure 6:
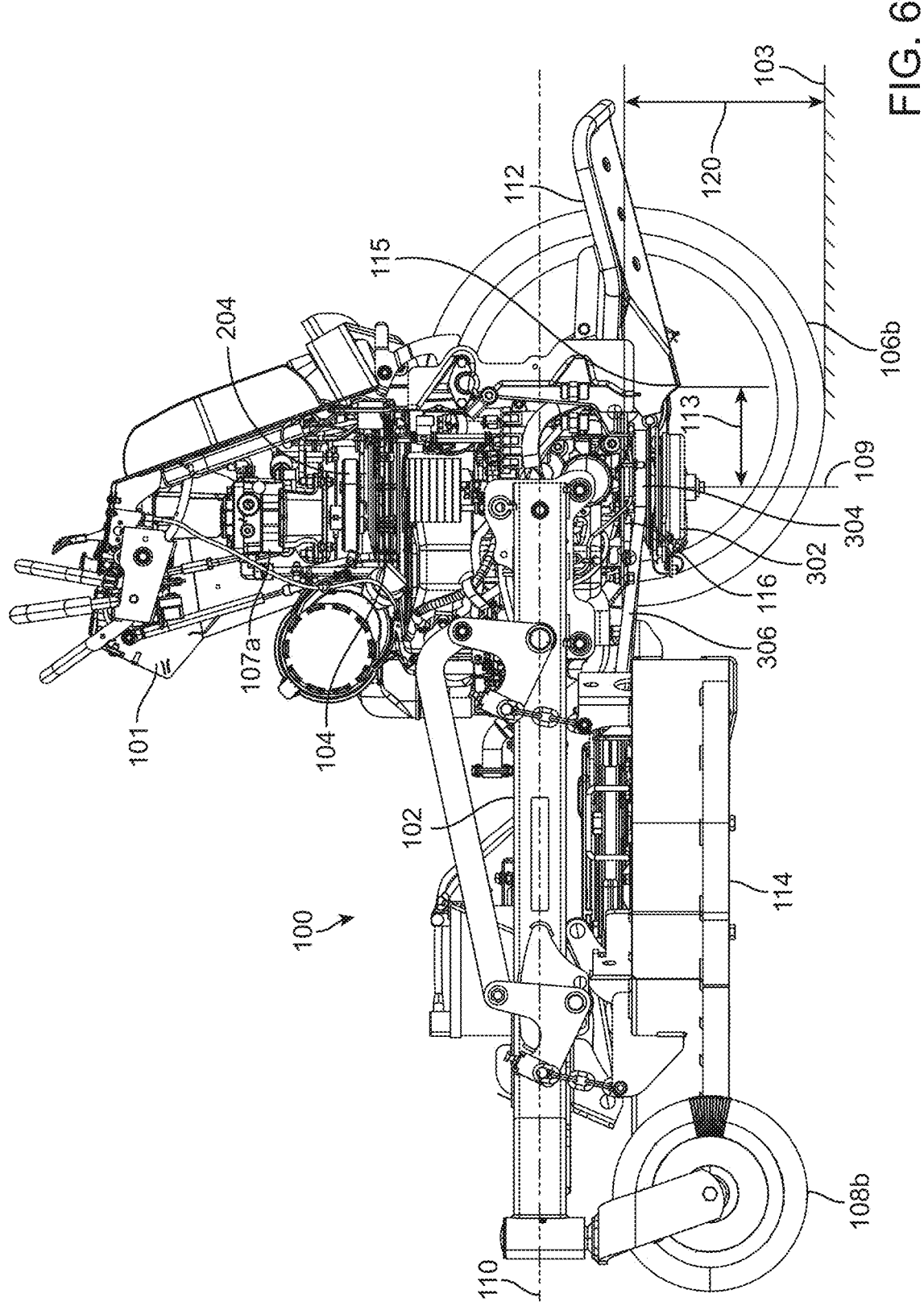
FIG. 6 is another partial side elevation view of the mower of FIG. 1, illustrating an exemplary location of the power source and traction drive system relative to an operator platform.

FIG. 6 is a partial side elevation view of the mower of FIG. 1 showing spatial relationships between the engine 104, control tower 101, operator platform 112, and other components of the mower. As indicated in this view, mowers and power systems in accordance with embodiments of the present disclosure provide a low, longitudinally compact vehicle that permits positioning of the hydrostatic pumps 107 above the engine 104. As compared to vehicles that power attached implements as well as a traction drive system via attachment to the lower drive shaft, vehicles like those described and illustrated herein allow the engine 104 to be located (near the control tower) relatively low in the frame 102. Moreover, as the hydrostatic pumps are not positioned behind the engine 104 as they might be with a more conventional lower drive shaft connection, the engine may be located in a relatively more rearward position in the frame 102. By locating the engine 104 aft and downward, the fleeting angle of the belt 306 (i.e., the angle the belt 306 makes with the pulley 304) may be reduced throughout the range of cutting deck elevations as compared to engine locations that are relatively high and forward in the frame.

Still further, engine locations like that provided on the exemplary mower 100 may provide a low center of gravity (CG) that remains fixed regardless of deck height position (i.e., the engine is attached to a stationary portion of the frame such that the engine remains at a fixed elevation relative to the frame during vehicle operation (e.g., the engine does not move with the cutting deck as cutting height is adjusted)). For example, in some embodiments, the engine 104 may be located in the frame 102 such that a lowermost portion or surface 116 of the engine housing (see FIG. 6) is located at an elevation 120 of 8 inches (in) to 13 in, and in another embodiment, 10-12 in, above a horizontal plane containing the ground surface 103 (assuming tires associated with the vehicle's wheels are inflated to the recommended operating pressure). Due to this relatively low position of the engine 104, the platform 112 may, as shown in FIG. 6, be located such that most, or even all, of the platform is behind the rotational axis 109 of the drive shaft (at least when the platform is deployed for receiving a standing operator). Stated more generally, the platform 112 is positioned such that it is longitudinally behind, but not necessarily beneath, the engine 104.

Figure 7:
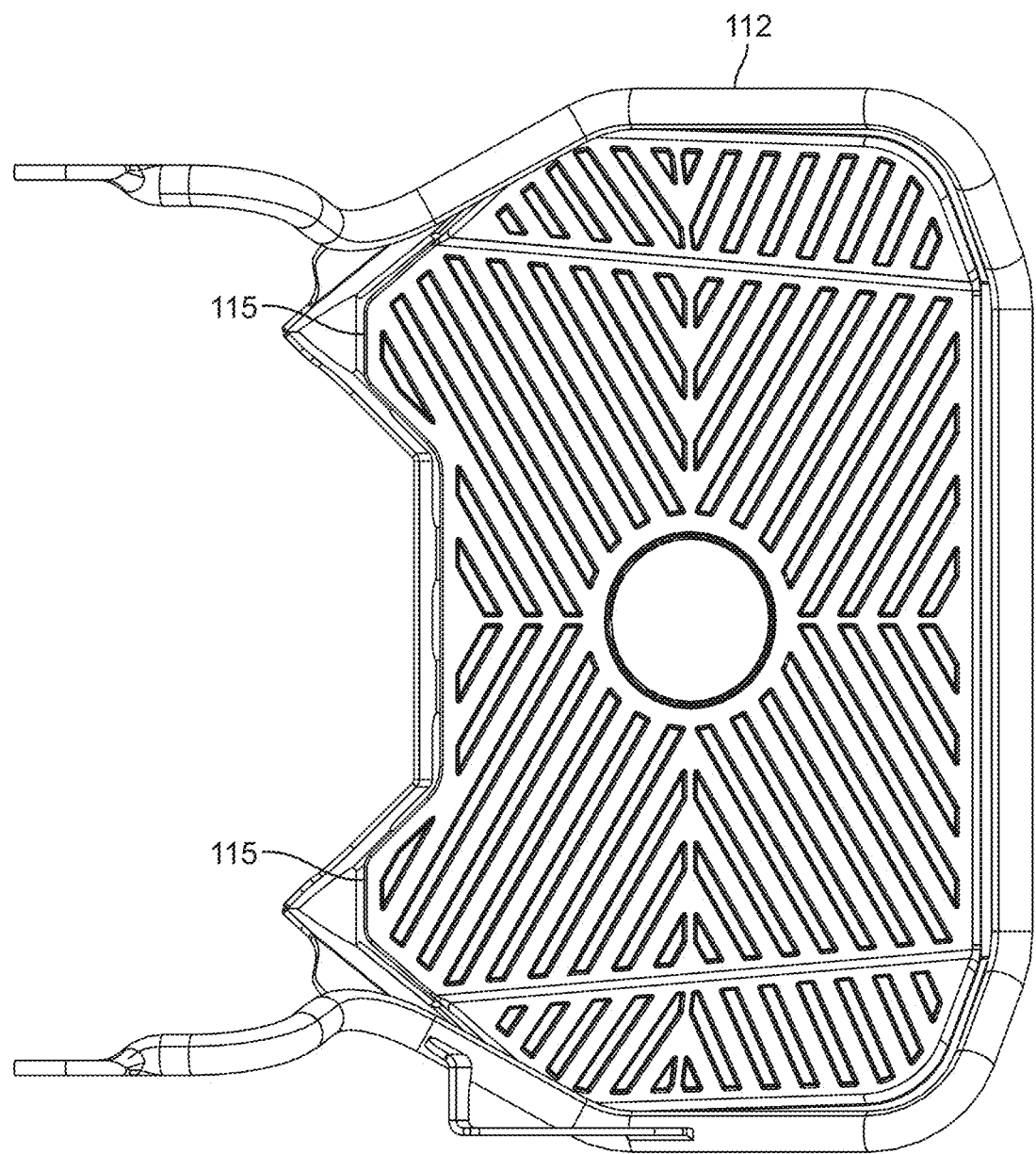
FIG. 7 is a top view of a standing platform in accordance with one embodiment of the present disclosure.

Moreover, locating the engine 104 rearwardly allows the platform 112 (and thus the operator) to be close to the engine and thus near the center of gravity (CG) of the mower. For example, in one embodiment, with the platform in a fully compressed or loaded condition (e.g., "bottomed out" relative to the frame), a longitudinal distance 113 between a forwardmost point 115 (see also FIG. 7) of a foot support area of the platform and the rotational axis 109 of the drive shaft (i.e., the distance 113 measured from the point 115 normal to a transverse plane containing the axis 109) is 3 in-7 in, and in other embodiments, 3.5-5.2 in. As used herein, the forwardmost point of the foot support area represents the forwardmost practical operating location of the operator's foot. As shown in FIG. 7, there may be platform structure forward of this point 115 (e.g., a vertical toe guard), but such structure is not intended to accommodate the operator's feet during normal operation. Of course, these dimensions (for engine height and longitudinal location) are exemplary only as actual dimensions may vary depending on the specific configuration (e.g., frame and/or platform size/construction, engine size, etc.) of the mower.

Figure 8:
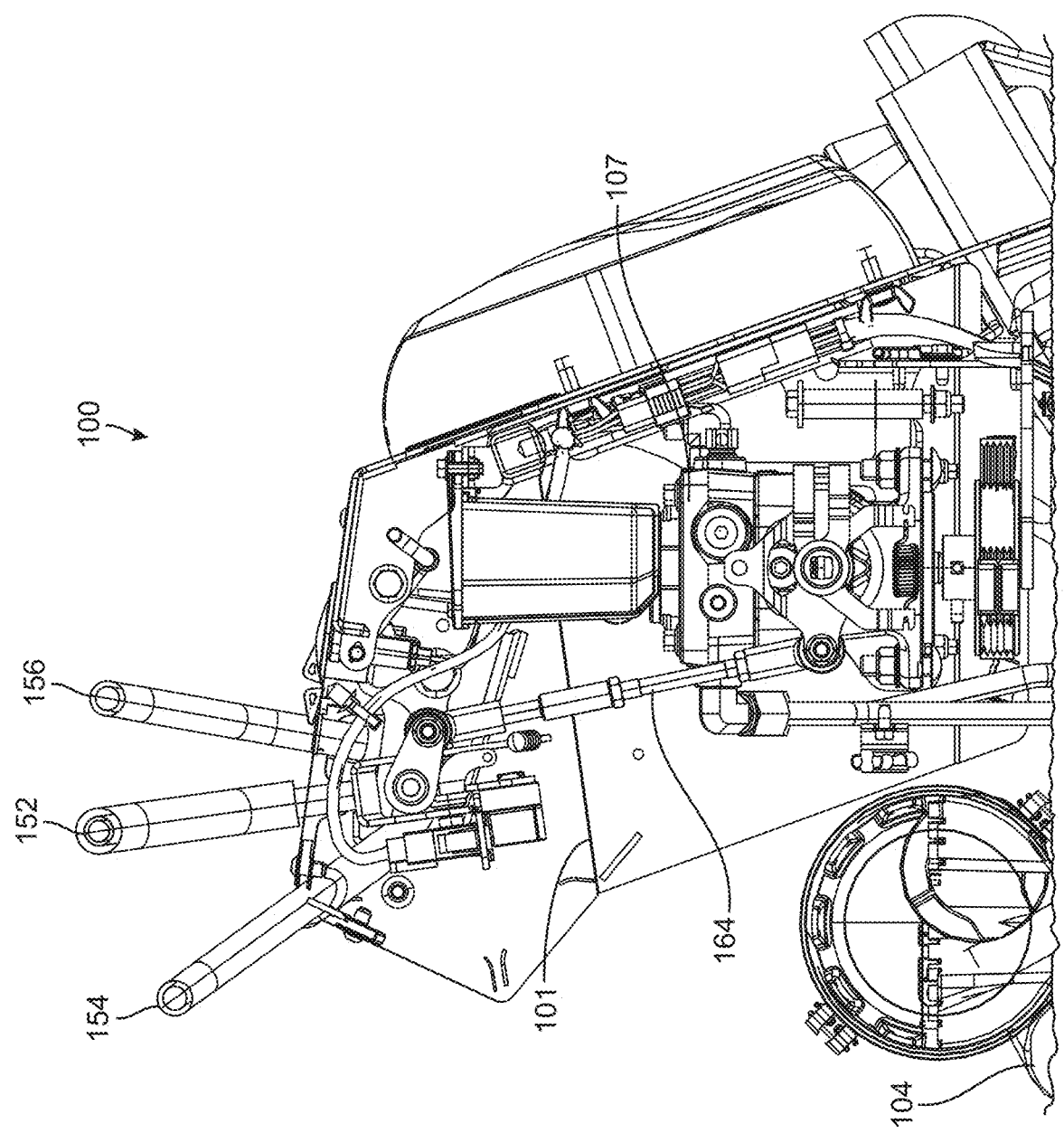
FIG. 8 is a partial side elevation view of the mower of FIG. 6 illustrating a drive control linkage in accordance with an exemplary embodiment of the disclosure.

Yet another advantage of mowers and power systems as described herein is illustrated in FIG. 8. In particular, because the hydrostatic pumps 107 are located relatively high in the control tower 101, they are positioned more closely to the operator controls (e.g., control levers 152) as compared to mowers that locate the pumps adjacent the bottom of the engine. As a result, a linkage 164 connecting each control lever 152 to its corresponding pump 107 may be relatively short, which may allow a simpler linkage that is more easily adjusted and may require less periodic maintenance as compared to more complex and longer linkages. Shorter linkages may also reduce deflection and friction at the various linkage joints.

Figure 9:
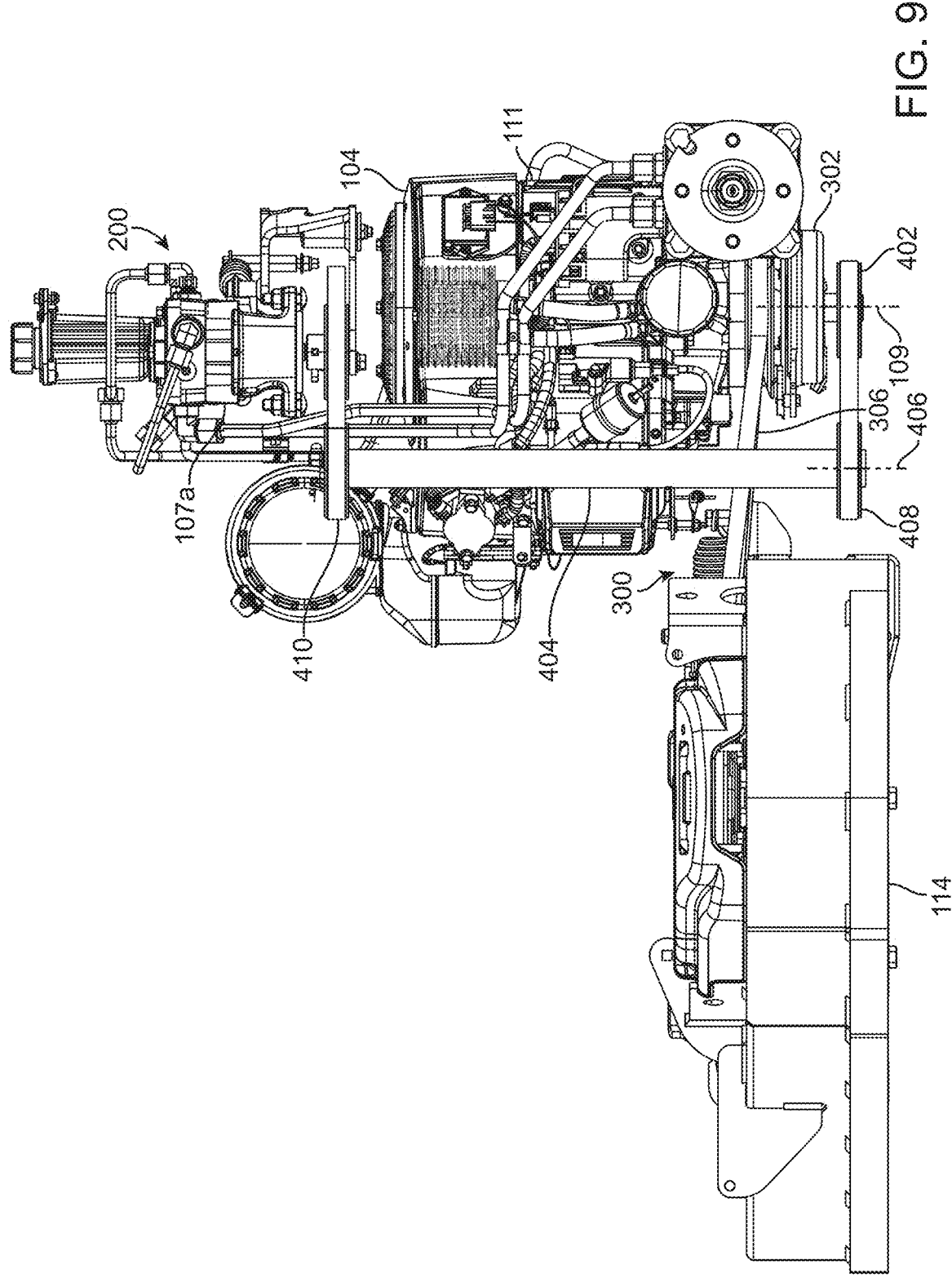
FIG. 9 is a partial side elevation view of a vehicle in accordance with another embodiment of the present disclosure.

While illustrated herein as achieving a compact design via drive shafts protruding from two opposite sides of an engine housing, other embodiments are also contemplated. For instance, as shown in FIG. 9, the engine 104 could alternatively include a single drive shaft (e.g., extending or protruding from the bottom surface of the engine housing 111) that includes two drive pulleys 302, 402 (wherein one (e.g., 302) or both may be a pulley/electromagnetic clutch). This design may allow the drive shaft and pulleys 302, 402 to power both the traction drive system and the implement drive system. In the embodiment of FIG. 9, a vertical jackshaft 404 may be provided and positioned adjacent to the engine 104 as shown. The jackshaft 404 may include a first end proximate the drive shaft, and a second end. The first and second ends may define a rotational axis 406 of the jackshaft that is parallel to the rotational axis 109 of the drive shaft. Moreover, the jackshaft may include an input pulley 408 located at or near the first end, and an output pulley 410 located at or near the second end. As shown in FIG. 9, the input pulley 408 may be operatively connected (e.g., via an endless belt) to the second drive pulley 402. The jackshaft 404 may be appropriately journaled to the frame 102 (not shown) to permit the jackshaft to rotate when driven by the second drive pulley 402.

The first drive pulley 302 may be operatively connected to the implement 114 (e.g., with the endless belt 306). Similarly, the output pulley 410 may be operatively connected to the traction drive system 200 (e.g., pumps 107a, 107b) via an endless belt. As a result, the jackshaft 404 may mimic the desired "dual" drive shaft configuration by providing a powered external shaft that extends, parallel to the crankshaft, to an opposite side (e.g., top) of the engine. Accordingly, some of the advantages of the dual drive shaft configuration described herein (e.g., lower engine position, more compact vehicle) may be achieved using an engine with a single drive shaft output.

While the embodiment of FIG. 9 is described with the pulley 302 driving the implement drive system 300 and the jackshaft 404 driving the traction drive system 200, such a configuration is exemplary only. That is, other embodiments may use the jackshaft to drive the implement and the pulley 302 to drive the traction drive system. Moreover, while shown as having the drive shaft vertically extending from the lower surface of the engine housing, other embodiments may use an upwardly extending drive shaft, or even a horizontal drive shaft without departing from the scope of this disclosure.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A powered grounds maintenance vehicle, comprising:
   a frame having a front end and a rear end, the frame supported upon a ground surface by ground engaging members;
   an implement connected to the frame;
   a traction drive system supported by the frame, the drive system adapted to provide driving power to at least one of the ground engaging members; and
   a prime mover attached to the frame, the prime mover comprising:
      an upper side and a lower side;
      a vertical first drive shaft extending downwardly from the lower side, the first drive shaft adapted to provide power to one of the implement and the traction drive system; and
      a vertical second drive shaft extending upwardly from the upper side, the second drive shaft adapted to provide power to the other of the implement and the traction drive system; and
   wherein the traction drive system comprises first and second hydrostatic pumps, the first and second hydrostatic pumps being located at an elevation above the upper side of the prime mover.

2. The vehicle of claim 1, further comprising a first belt in engagement with a first pulley of the first drive shaft, the first belt further engaged with an input pulley of the implement.

3. The vehicle of claim 2, further comprising a second belt in engagement with a second pulley of the second drive shaft, the second belt further engaged with an input pulley of the traction drive system.

4. The vehicle of claim 3, wherein the second belt connects the second pulley and input pulleys of each of the first and second hydrostatic pumps.

5. The vehicle of claim 1, wherein the ground engaging members comprise a front ground engaging member and a rear ground engaging member, and wherein the implement is a cutting deck positioned between the front ground engaging member and the rear ground engaging member.

6. The vehicle of claim 1, wherein the prime mover comprises an internal combustion engine.

7. A stand-on riding grounds maintenance vehicle, comprising:
   a frame having a front end, a rear end, and a longitudinal axis extending between the front and rear ends, the frame further comprising a control tower at or near the rear end;
   a platform attached to the frame at or near the rear end, the platform adapted to support a standing operator;

left and right rear drive wheels located near the rear end of the frame;
left and right front wheels located near the front end of the frame;
an implement connected to the frame;
a traction drive system supported by the frame, the drive system adapted to provide driving power independently to each of the left and right rear drive wheels; and
an engine attached to the frame at or near the control tower, the engine comprising:
  an engine housing having an upper side and a lower side;
  a vertical first drive shaft extending downwardly from the lower side, the first drive shaft operatively connected to a first pulley, wherein a first belt is operatively coupled to the first pulley and to an input pulley associated with the implement; and
  a vertical second drive shaft extending upwardly from the upper side, the second drive shaft operatively connected to a second pulley, wherein a second belt is operatively coupled to the second pulley and to a plurality of input pulleys associated with the traction drive system.

8. The vehicle of claim 7, wherein the traction drive system comprises:
a left and a right hydrostatic pump, each hydrostatic pump comprising an input pulley of the plurality of input pulleys; and
left and right hydraulic motors hydraulically coupled to the left and right hydrostatic pumps, respectively.

9. The vehicle of claim 8, wherein the left and right hydrostatic pumps are located at an elevation above the upper side of the engine and longitudinally between a front and a rear side of the engine housing.

10. The vehicle of claim 7, wherein the first pulley is part of a clutch adapted to selectively enable and disable power to the implement.

11. The vehicle of claim 7, wherein at least a portion of the platform is located between the left and right rear wheels.

12. The vehicle of claim 7, wherein the first and second drive shafts comprise coaxial opposite ends of a common crankshaft.

13. The vehicle of claim 7, wherein the first and second drive shafts define a common rotational axis, and where a distance between the rotational axis and a forwardmost point of a foot support area of the operator platform is 3 inches to 7 inches.

14. The vehicle of claim 7, wherein the rear drive wheels and front wheels support the vehicle upon a ground surface, and wherein a lowermost surface of the engine housing is located at an elevation of 8 inches to 13 inches above a horizontal plane containing the ground surface.

* * * * *